Patented Sept. 12, 1950

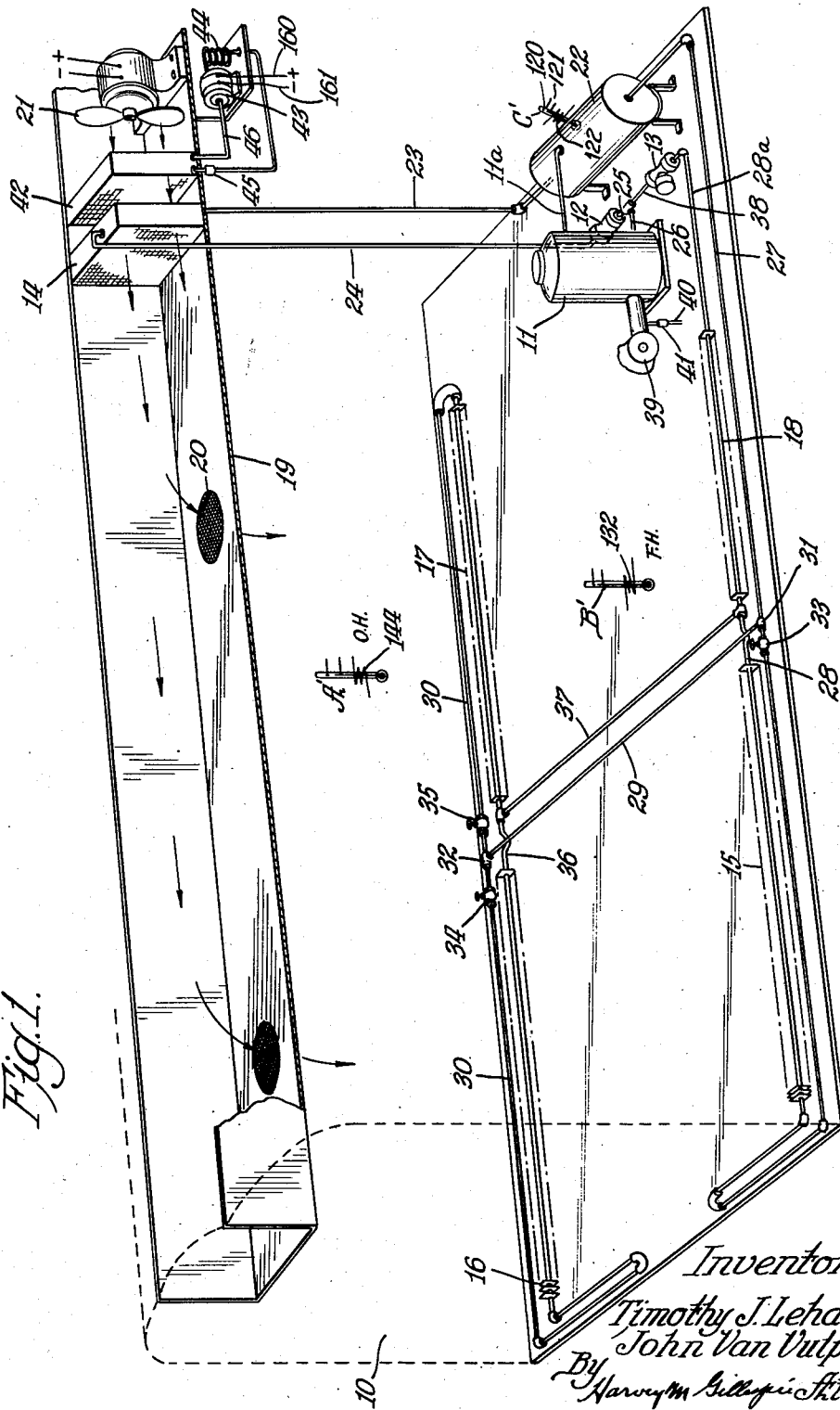

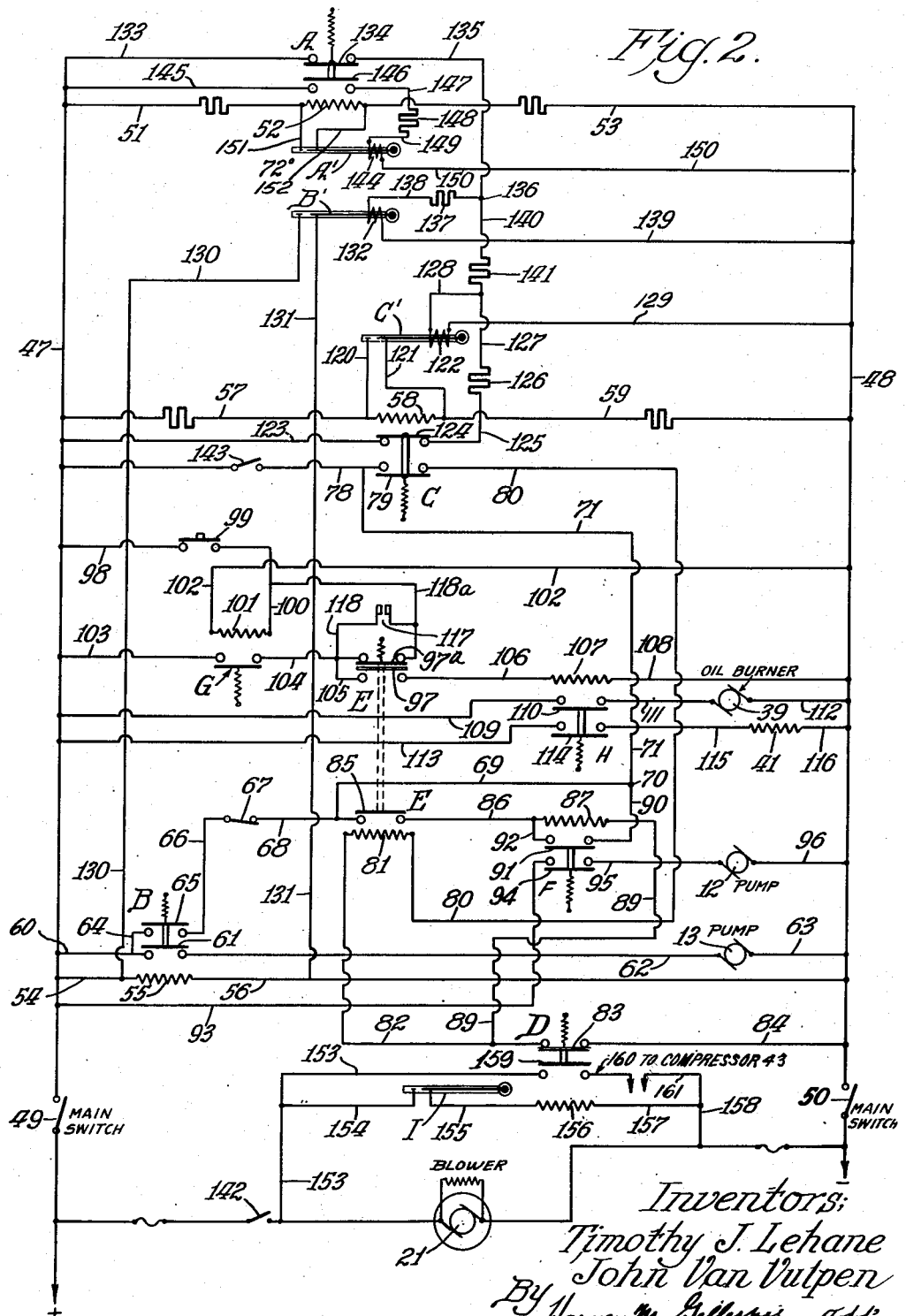

2,522,285

UNITED STATES PATENT OFFICE 2,522,285

HOT-WATER HEATING SYSTEM

Timothy J. Lehane and John Van Vulpen, Chicago, Ill., assignors, by mesne assignments, to Vapor Heating Corporation, a corporation of Delaware Application March 22, 1946, Serial No. 656,286

9 Claims. (Cl. 237—8)

This invention relates to improvements in temperature control apparatus for controlling the temperature of an enclosed space.

One of the principal objects of the invention is to provide a temperature control system which is particularly suitable for use in situations where it is desirable to control the operations of a heat generator, the delivery of the heat into the space whose temperature is being controlled, and to also control the functioning of a cooling apparatus for delivering cooled air into the said space when heating is not required.

Another principal object of the invention is to provide an improved temperature control panel, including a plurality of temperature responsive elements and relays associated therewith, for controlling the operations of a combination heating and cooling apparatus and which, when necessary to attain proper operation of said apparatus, is effective to automatically adjust certain of the temperature responsive elements so as to effect economies in the operation of the heating apparatus.

Another object is to provide, in a temperature control system of the above character, a master control thermostat which is responsive to temperature changes within the enclosed space to adjust certain other associated thermostats which function to control cooperating elements of the heating apparatus.

The above object, stated more specifically, includes the provision of a master thermostat, responsive to the temperature of the space being controlled, which functions through its relay to adjust a second thermostat for controlling one or more secondary heaters, and a thermal switch which is responsive to the temperature of the heat transfer medium circulated in the radiators.

The invention also includes the provision of electrical connections so that the master thermostat cycles through its associated relay and the second mentioned thermostat and the thermal switch are cycled through said relay, by the addition of auxiliary electrical heat to them when the first mentioned thermostat is satisfied and one of the thermal switches is also cycled through another relay in addition to the inverse cycling thereof through the relay of the first mentioned thermostat.

The invention is illustrated in the accompanying drawings wherein:

Fig. 1 is a diagrammatic view illustrating a combined heating and cooling apparatus constructed in accordance with this invention, and Fig. 2 is a wiring diagram of a control panel for controlling the operation of said combined heating and cooling apparatus.

The apparatus herein shown is designed for use in heating and cooling the passenger space 10 of a railway car, but the invention is not limited to this specific use. Obviously it can be used in many other situations where it is desirable to control the temperature of an enclosed space.

Referring first to the heating apparatus shown in Fig. 1: This apparatus includes, preferably, a hot water boiler 11, a pair of electrically operated pumps 12 and 13 for circulating a heat exchanging medium, through radiators located within the space 10 or otherwise adapted to supply heat thereto. The radiators include an overhead radiator 14 and a plurality of floor radiator sections 15, 16, 17 and 18. The overhead radiator 14 is located in a duct 19 which extends substantially the full length of the space being heated. The said duct is provided at suitable locations with outlet openings 20 for delivering the tempered air (heated or cooled) into the space 10. The delivery of said tempered air is facilitated by a blower 21 positioned to force air through the overhead radiator 14 and thence into the space 10 through the duct 19.

In the present application hot water is used as a heat transfer medium. The water is delivered from the boiler 11 through pipe 11a to a storage tank 22, the latter of which is connected by a conduit 23 to the overhead radiator 14; a conduit 24 leads from the overhead radiator to the suction side of pump 12. The pressure side of the pump is connected by conduits 25 and 26 to the return port of the boiler 11. It will be apparent, therefore, that when the pump 12 is operated the heated water will be drawn from the storage tank 22 to the overhead radiator 14 and is then forced back into the boiler 11.

The floor radiator is composed of several sections designated 15, 16, 17, and 18 which are arranged in pairs on opposite sides of space 10. Each pair extends substantially the full length of said space and may be formed with angular end portions to supply heat to the end portions of the space. A feed pipe 27 leads from the storage tank 22 to the remote end of floor radiator section 15. The return end of this section is connected by means of a pipe 28 to the inlet of radiator section 18 and the return end of radiator section 18 is connected by pipe 28a to the suction side of pump 13. The feed pipe 27 is connected by means of a cross branch 29 to a feed pipe 30 located on the other side of the space 10 and extending the full length of radiator sections 16 and 17. The cross branch 29 is connected in the feed pipe 27 by means of T-fitting 31 located about midway of its length. The other end of branch 29 connects in pipe 30 through a similar fitting 32. The feed pipe 27 is also provided with a hand valve 33 so that the heating medium can be shut off from the radiator section 15 and directed through the cross branch 29 to the T-fitting 32. The pipe 30 is provided with hand valves 34 and 35 located on opposite sides of fitting 32 so that the heating medium can be directed through either or both the valve 34 and 35 and into the remote ends of radiator sections 16 and 17. The return ends of radiator sections 16 and 17 are connected by pipes 36 and 37 to the inlet end of radiator section 18.

The use of the hand valves 33, 34, and 35 makes it practicable to circulate the heating medium through any two or more of the floor radiator sections. For example, when the hand valve 33 is opened and the valves 34 and 35 are closed, the heating medium flows from storage tank 22 through the pipe 27 to the remote end of radiator section 15, thence through pipe 28 and radiator section 18 to the return pipe 28a, and pump 13. The pump 13 then forces the water through pipes 38 and 26 into the boiler 11. If it should be desired to circulate the water through only half of the floor radiator sections, the hand valves 33 and 35 may be closed and the valve 34 opened. In this event the water will flow from the pipe 27 through the cross branch 29 to the fitting 32 and thence through the supply pipe 30 to the remote end of radiator section 16. The water returns through the pipe 36 cross branch 37 and radiator section 18, and pipe 28a to pump 13. If it is desired to circulate heating medium through all of the radiator sections 15, 16, 17, and 18, all of the valves 33, 34, and 35 are opened. In this event the heating medium will flow to the remote ends of radiator sections 15, 16 and 17 and will return to the pump 13 through the radiator 18.

The boiler 11 may be heated by any suitable means capable of being automatically controlled. For the purpose of illustration in the present application, the boiler 11 is heated by means of an oil burner 39 of a conventional type. The oil is supplied to the burner through the pipe 40 controlled by a solenoid valve 41.

The necessary combustion air is supplied to the boiler 11 by means of an electrically operated blower which forms a part of the oil burner 39.

The air cooling apparatus includes a cooling device 42, an electrically operated compressor 43, and a condenser coil 44. The coolant fluid flows from the condenser coil 44 through an expansion valve 45 into the cooling device 42 and is withdrawn through a return pipe 46 to the compressor 43. The cooler 42 is preferably arranged within the duct 19 at a location intermediate the overhead radiator 14 and the blower 21 so that the blower may be used during both the heating and the cooling of the space 10.

The heating and cooling functions of the apparatus are controlled by means of electrically actuated devices including a plurality of temperature responsive devices and relays associated therewith. These various control devices and their electric connections constitute the control panel illustrated diagrammatically in Fig. 2 of the drawing.

The positive and negative main lines 47 and 48 are opened and closed by means of main switches 49 and 50, respectively. When these switches are in their open positions, as shown in Fig. 2, all of the electrically energized devices of the panel are deenergized. The various temperature responsive devices of the panel are shown in the positions which they assume when the temperature of the space 10 is below the normal (for example 72°) to be maintained therein.

The reference letters A, B, and C designate electrically actuated relays. The electric circuits for actuating these relays are energized when the main switches 49 and 50 are closed. The said relay energizing circuits are controlled by thermostats designated A' and B' which respond to temperature changes within the space 10, and by a thermal switch C' which responds to the temperature changes of the heat exchange medium. The energizing circuit for relay A leads from the positive line 47 through wire 51 to solenoid 52 and thence through wire 53 to the negative line 48. The energizing circuit for relay B leads from the positive line through wire 54 to relay solenoid 55 and thence through wire 56 to the negative line. The energizing circuit for relay C leads from the positive line through wire 57 to solenoid 58 and thence through wire 59 to the negative line.

As a result of the closing of the three circuits just mentioned, the solenoids 52, 55 and 58 are energized and thereby move the relays A, B, and C to their closed positions and thereby close certain circuits which make it possible to start the operation of the heating apparatus. One of these controlled circuits leads from positive line 47 through wire 60 through the lower contact 61 of relay B, wire 62, pump 13, and wire 63 to the negative line 48. Another circuit is closed through the relay B as follows: from wire 60 through wire 64, open contact 65 of relay B, wire 66 through normally closed switch 67, wires 68 and 69 to terminal 70, and thence through wires 71 and 78, lower contact 79 of relay C to wire 80, solenoid 81, wire 82, closed contact 83 of cooler pilot relay D, and wire 84 to the negative line 48. This circuit energizes the solenoid 81 so as to actuate the relay E to its closed position. The energization of relay E closes a circuit through its lower contact arm 85. This circuit leads from the wire 68 to wire 86, solenoid coil 87 and wire 88 to the closed contact 83 of relay D, and thence through wire 84 to the negative line 48. This circuit energizes the said solenoid 87 and closes its associated relay F. Upon the closing of relay F, a holding circuit is established for holding the relay F closed. This circuit leads from terminal 70 through wire 90, open contact arm 91 of relay F, wire 92, solenoid 87, wire 89, contact 83 of relay D and wire 84 to the negative line. It will be seen, therefore, that this holding circuit will be maintained during the initial heat up period of the heating apparatus even though the contact 85 of relay E may be momentarily opened. The energization of relay F also closes a circuit through the pump 12 so as to start the circulation of the heat transfer medium through the overhead radiator 14. This pump operating circuit leads from positive line 47, through wire 93, lower contact 94 of relay F, wire 95, pump 12 and wire 96 to the negative line.

The energization of relay E and the consequent closing of its contact arm 97 makes it possible to start the oil burner 39 operating to heat the boiler 11. The oil burner starting circuit leads from positive line 47 through wire 98, push button 99 and wire 100, through a holding coil 101 and thence through wire 102 to the negative line 48. The energization of holding coil 101 closes the relay G and thereby closes an energizing circuit through solenoid 107 of a burner relay H. This circuit leads from positive line 47 through wire 103 relay G wire 104 and 105, middle contact arm 97 of relay E, wire 106, solenoid coil 107 of said relay H, and thence through wire 108 to the negative line. The energization of relay H closes an operating circuit through the motor for operating the blower of oil burner 39 and also energizes the solenoid valve 41 for controlling the supply of oil to the burner. The burner operating circuit leads from the positive line 47 to wire 109, open contact 110 of relay H, wire 111, blower motor 39 of an oil burner and wire 112 to the negative line 48. The circuit for actuating the solenoid valve 41 leads from the positive line to wire 113, lower contact 114 of relay H, wire 115, valve solenoid 41, and wire 116 to the negative line.

The oil burner 39 may be provided with any suitable form of ignition, such, for example, as a pilot light or an electrical sparking device connected in parallel with the burner operating circuit.

The holding coil 101 for relay G is of such construction that it will retain sufficient magnetism, after the opening of the push button contacts to maintain the relay G closed for about 45 seconds. If the oil burner operates properly for a period of 45 seconds, the stack temperature from the boiler will be raised sufficiently to close a thermal switch 117 positioned in the smoke stack. The closing of stack switch 117 will close a holding circuit for the relay coil 101. This holding circuit leads from wire 104 through wire 118, and, closed contacts of stack switch 117, wire 118a, to wire 100, and, thence through coil 101 and wire 102 to the negative line. This holding circuit will continue during the operation of the heating apparatus.

After the burner is once started to operate, it will continue operation under the control of the thermal switch C' and relay C, since the residual magnetism of solenoid 101 will hold the oil burner operating circuits closed for approximately 45 seconds and this time is sufficient to effect a closing of the stack switch 117. The closing of said contact 117 completes a holding circuit through solenoid 101 and therefore maintains the relay G closed. The stack switch contacts 117, when once closed, will remain closed for an appreciable period after the oil burner has ceased operation and consequently ceases to supply heat to the stack switch. If the stoppage should be due to any cause while the relay E is energized, the stack switch contacts 117 will open and thereby stop all operations of the burner. However if the operation of the burner is interrupted by opening of the relay E, for example when thermostat C' is satisfied, the contact 97a of relay E will move to the position shown in Fig. 2 to complete a holding circuit through solenoid 101 of relay G before the contacts 117 of the stack switch move to their open position.

The thermal switch C' is preferably of the mercury column type and is provided with spaced contacts which are connected by wires 120 and 121 to opposite leads of the solenoid 58. It will be seen therefore that when the temperature at the thermal switch C' is sufficient to move the mercury into engagement with its outer contact the electric current is by-passed around the solenoid 58 and thereby releases the relay C so as to permit its contact arms to return to the position indicated in Fig. 2 of the drawings.

The above position of the relay C opens the energizing circuit through solenoid 81 of relay E and thereby permits relay E to return to the position indicated in Fig. 2 to open the energizing circuit through solenoid 107. The deenergization of solenoid 107 permits relay H to move to a position to open the circuit through the oil burner motor 39 and also opens the circuit through the fuel valve solenoid 41 to shut off the supply of fuel.

The thermal switch C' is preferably inserted in the hot water storage tank 22 so as to respond to temperature changes of the water circulated through the radiators. The thermal switch C' may be set to function at any suitable temperature. This setting may be temporarily adjusted by energizing an auxiliary electric heater 122 associated with the thermal switch. The heating circuit through said auxiliary heater is effective when the relay C is energized. This circuit leads from the positive line 47 through wire 123, the upper contact 124 of relay C, wire 125, cycle resistor 126, wires 127 and 128 through the auxiliary heater 122, and thence through wire 129 to the negative line 48. The value of cycle resistor 126 is such as to add approximately 10° of heat to the thermal switch C'. Consequently the thermal switch will cycle when the water in storage tank 22 reaches a temperature of 10 below the normal setting of the thermal switch C'. Consequently the burner will be operated intermittently because of the cycling of the thermal switch until the water reaches its maximum temperature.

When the relay C is deenergized during the preliminary heat up phase of the system or during a stand by period when the blower 21 is not operated, both pumps 12 and 13 will continue to operate to circulate hot water through the overhead and floor radiators, but this operation of both pumps is controlled by the relay B under the control of the floor heating thermostat B'. The floor heating thermostat B' is of mercury column type and is provided with space contacts which are connected by means of wires 130 and 131 to opposite leads of the solenoid 55. Consequently when the thermostat B' is satisfied the electric current is by-passed around the solenoid 55 so as to open the circuit through pump 13 and also open this circuit through solenoid 87, so as to release relay F and thereby open the circuit through pump 12. If the floor heat thermostat B' is satisfied before the thermal switch C' functions to open relay C, the functioning of thermostat B' will stop operation of the floor pump 13 by opening relay B, but the pump 12 will continue to circulate water through the overhead radiator 14 until the holding circuit for relay F is opened.

The thermostat B' is preferably arranged near the floor of the space so as to respond more readily to the heat discharged from the floor radiator sections. Consequently this thermostat will have control of the system during the heat up period, since the over head thermostat A' will be influenced to a lesser degree by the heat discharged from the floor radiators. However, if the conditions are such that the over head thermostat is caused to function, the functioning thereof will short circuit the relay solenoid 52 so as to permit the relay A to return to the position indicated in Fig. 2 and thereby direct heating current through an auxiliary heater 132 of the thermostat B' and also direct additional heating current through the auxiliary heater 122 of thermal switch C'.

The heating current for the auxiliary heater of thermostat B' leads from positive line 47 through wire 133, the closed contact arm 134 of relay A, wire 135 to terminal 136, thence through cycle resistor 137, wire 138, auxiliary heater 132 of thermostat B', and thence through wire 139 to the negative line. The value of resistor 137 is such that it adds approximately 4° of heat to thermostat B'. The additional heating circuit through auxiliary heater 122 follows the last circuit described to terminal 136 and thence through wire 140, cycle resistor 141, and wires 128 and 129 to the negative line. The resistor 126, and 141 function to lower the functional setting of the thermal switch C', but the value of the resistor 141 relative to resistor 126 is such that when relay C is closed to make cycle resistor 126 effective to add heat to the auxiliary heater 122 of thermal switch C', there will be no substantial current passed through the resistor 141 to the auxiliary heater 137 of thermostat B'.

Thus far, the heating system has been described in regard to the circuits and the operations which take place when the blower 21 is not operating to force heated air through duct 19. However, when it is desired to deliver heated air into the space 10, a gang switch, composed of arms 67, 142 and 143 is operated so as to close the switch arms 142 and 143 and simultaneously open switch arm 67. This position of the switch arms energizes the blower 21 so as to force air through the over head radiator 14 and into the space 10. The overhead radiator now becomes the primary heater of the space and will operate throughout the normal heating until the main switch arms 49 and 50 or the gang switch is operated to open switch arms 142 and 143. When the over head heater is effective to deliver hot air into the space, the floor radiators are operated as secondary heaters under the control of the floor heat thermostat B'. In such case the floor radiators add only such additional amounts of heat to the temperature controlled space 10 as may be required, from time to time, to make up for any deficiency in the supply from the overhead heater 14.

The floor heat thermostat B' and overhead thermostat A' are preferably set to function at the same temperature for example 72°, but the over head thermostat operates to adjust the thermostat B' and the thermal switch C'. These adjustments are executed through the relay A by adding heating current through resistors 137 and 141 to the said thermostat B' and thermal switch C' when the over head thermostat is satisfied. These auxiliary heating circuits have been previously described.

The overhead thermostat A' is provided with an auxiliary heater 144 which is energized through the relay A when the thermostat A' is unsatisfied. This heater circuit leads from negative line 47 through wire 145, lower contact 146 of relay A, wire 147, cycle resistor 148, and wire 149 through auxiliary heater 144, and thence through wire 150 to the negative line 48.

The said cycle resistor 148 has a value which will pass sufficient current through the auxiliary heater 144 to raise its temperature 4°. Consequently the overhead thermostat when set to functioning at a space temperature of 72° will cycle when the space temperature rises to 68° and will operate intermittently for progressively decreasing periods of time until the space temperature reaches 72°. When the overhead thermostat functions, the relay A is released and returns to the position indicated in Fig. 2 and thereby adds heating current to both the thermostat B' and thermal switch C' so as to accelerate the closing of their contacts. The said relay A is released when thermostat A' is satisfied, since its spaced contacts are connected by means of wires 151 and 152 to opposite leads of the relay solenoid 52. Consequently when the thermostat A' functions, the electric current is by-passed around the solenoid 52 to release the relay A. In this way the operation of the overhead and the floor heaters are brought into harmony and their operations discontinued when the space temperature adjacent the floor thermostat B' and overhead thermostat A' reaches 72°.

The cooling apparatus is set to function when the temperature rises within the space to approximately 80°. Consequently there is no likelihood of the heating and the cooling mechanism functioning at cross purposes, since the heating stops at 72° and the cooling starts at a higher temperature for example 80°. The cooling means is controlled by a thermostat I. This thermostat functions to close an energizing circuit to energize a cooling pilot relay. This energizing circuit is in parallel with the blower 21 and leads from switch 142 to wires 153 and 154 through the mercury column of thermostat I, wire 155, solenoid 156, and wires 157 and 158 to the negative line 48. The energizing of solenoid 156 operates relay D to open the circuit contact 83 and therefore deenergizes all the heating apparatus. The closing of said relay D also closes an operating circuit wire 153, lower contact 159 of relay D, and thence wire 160 to compressor 43 (see Fig. 1), and wires 161 and 158 to the negative line. This circuit operates the cooling mechanism so that cooled air is forced through the duct 19 and delivered through the openings 20 thereof into the temperature controlled space 10.

We claim:

1. In combination with a radiator for supplying heat to an enclosed space, a boiler for supplying a liquid heating medium to the radiator, an electrically actuated fuel burner for heating said boiler, means including a thermostat responsive to the temperature of the heating medium for making and breaking an electric circuit through said fuel burner, electrically energized pump means for controlling the delivery of said heating medium to said radiator, control means including a second thermostat responsive to the temperature of said enclosed space for opening and closing a circuit through said pump means, electrically energized means for adjusting the functional settings of said thermostats, and means including a third thermostat responsive to the temperature of the enclosed space for opening and closing energizing circuits through said means for adjusting the functional settings of the first and second thermostats.

2. In combination with a radiator located near the floor of an enclosed space, an over-head radiator, a boiler for supplying heating medium to said radiators, electrically energized means for controlling the supply of heating medium to said radiators, means including a thermostat responsive to temperature changes within the enclosed space for opening and closing electric circuits through said electrically energized means, an electrically actuated device for controlling the supply of fuel to the boiler, means including a thermal switch responsive to temperature changes of the heating medium for opening and closing a circuit through said electrically actuated device, auxiliary electric heaters for adjusting the functional settings of said thermostat and said thermal switch, and means including a second thermostat responsive to temperature changes within the space for opening and closing electric circuits through said auxiliary heaters.

3. In combination with a radiator located near the floor of an enclosed space, an over-head radiator, a boiler for supplying heating medium to said radiators, electrically operated pumps for controlling the supply of heating medium to said radiators, means including a thermostat responsive to temperature changes within the space for opening and closing electric circuits through said pumps, an electrically actuated device for controlling the supply of fuel to said boiler, an electrically energized relay for opening and closing a circuit through said electrically actuated device, a thermal switch responsive to temperature changes in the heating medium for controlling the energization of said relay, an auxiliary electric heater for said thermal switch and an energizing circuit therefor connected through said relay, whereby the thermal switch will cycle when the heating medium reaches a predetermined temperature, a second relay for opening and closing a circuit for supplying additional heating current to said auxiliary heater, and a second thermostat responsive to temperature changes within the space for controlling the energization of the second relay.

4. In combination with a radiator for supplying heat to an enclosed space, a boiler for supplying a liquid heating medium to said radiator, electrically operated pumps for controlling the supply of heating medium to said radiator, a thermostat responsive to temperature changes within the space for opening and closing an operating circuit for said pump, an electrically actuated device for controlling the supply of fuel to said boiler, an electrically energized relay for opening and closing a circuit through said electrically energized device, a thermal switch responsive to temperature changes in the heating medium for controlling the energization of said relay, an auxiliary electric heater for said thermal switch and an energizing circuit therefor connected through said relay, whereby the thermal switch will cycle when the heating medium reaches a predetermined temperature, a second relay for opening and closing a circuit for supplying additional heating current to said auxiliary heater, and a second thermostat responsive to temperature changes within the space for controlling the energization of the second relay.

5. In combination with a radiator for delivering heat into an enclosed space, a heat generator for heating a fluid to be delivered to the radiator, means including a thermal switch responsive to temperature changes of said fluid for controlling the operation of said generator, electrically energized means for controlling the delivery of said fluid to the radiator, means including a thermostat responsive to temperature changes in the enclosed space and effective below a predetermined temperature to close an energizing circuit through said electrically actuated control means, an auxiliary electric heater for said thermal switch and an energizing circuit which is effective to add heat to the thermal switch when the latter is unsatisfied, an auxiliary heater for said thermostat, a second thermostat responsive to temperature changes at another location within the enclosed space, an auxiliary electric heater for this thermostat, a relay controlled by the second thermostat and adapted while the second thermostat calls for heat to close an energizing circuit through its auxiliary heater and adapted when said second thermostat is satisfied to close circuits for energizing the auxiliary heater of said first mentioned thermostat and for supplying additional heating current to the auxiliary heater of said thermal switch, whereby the second thermostat will cycle above a predetermined temperature of the enclosed space and the thermal switch and the first mentioned thermostat will receive auxiliary heat during the cooling period of the auxiliary heater for the second mentioned thermostat.

6. In combination with a radiator for delivering heat into an enclosed space, a heat generator for heating a fluid to be delivered to the radiator, means for controlling the functioning of said generator comprising a thermal switch responsive to the temperature changes of the said fluid, a relay controlled by the thermal switch and adapted when the thermal switch is unsatisfied to close a section of an electric circuit, a second relay for closing another section of said circuit, a third relay energized by the completion of said circuit, an electrically actuated pump for controlling the delivery of said fluid to the radiator, a fourth relay for controlling an operating circuit for the pump, an energizing circuit for the fourth relay closed through the energized position of the third relay, and a thermostat responsive to temperature changes within the space for controlling the energization of the second relay.

7. In combination with a radiator for delivering heat into an enclosed space, a heat generator for heating a fluid to be delivered to the radiator, means for controlling the functioning of said generator comprising a thermal switch responsive to the temperature changes of the said fluid, a relay controlled by the thermal switch and adapted when the thermal switch is unsatisfied to close a section of an electric circuit, a second relay for closing another section of said circuit, a third relay energized by the completion of said circuit, an electrically actuated pump for controlling the delivery of said fluid to the radiator, a fourth relay for controlling an operating circuit for the pump, an energizing circuit for the fourth relay closed through the energized position of the third relay, and means for opening said relay controlled circuits comprising a fifth relay and a control thermostat therefor responsive to the temperature of the enclosed space adapted to function at a temperature higher than the previously mentioned thermostat to actuate the fifth relay.

8. In combination with a radiator for delivering heat into an enclosed space, a boiler for supplying heating medium to the radiator, electrically operated means for supplying fuel and combustion air to the boiler, an electrically energized relay for closing operating circuits through said means for supplying fuel and air to the boiler, a relay for closing a section of a circuit through the first mentioned relay, a thermostat responsive to the temperature of said heating medium for controlling the energization of the second mentioned relay, and means for completing the energizing circuit for the first mentioned relay comprising a normally open relay, a solenoid circuit for closing the normally open relay to complete the energizing circuit for the first relay, a holding circuit including a thermal switch responsive to a rise in the stack temperature to maintain said solenoid energized and including also a relay contact of said second mentioned relay effective to maintain said holding circuit when the second mentioned relay is deenergized, whereby the fuel supply means may be stopped and started while said holding circuit is maintained, means for controlling the delivery of heating medium to the radiator independently of the operation of said boiler comprising a pump, an operating circuit therefor, and a temperature responsive device for controlling the effectiveness of the last mentioned circuit.

9. In combination with means for delivering a stream of air into an enclosed space, a radiator for adding heat to the air stream, a second radiator located in the space for adding heat to the atmosphere therein and comprising a plurality of sections, a delivery pipe leading to the remote ends of a plurality of said sections, hand valves interposed in the feed pipe, whereby the several sections may be selectively used, a conduit connecting the return ends of certain of said sections with the receiving end of one section, a boiler for supplying heating medium to both of said radiators, a pump for inducing circulation of the heating medium through the first mentioned radiator, an operating circuit which is continuously effective to operate said pump during the delivery of hot air into the space, a second pump connected to the return end of the last mentioned radiator section for inducing circulation of heating medium through the selected sections of the second mentioned radiator, a relay for controlling an operating circuit through the second pump and a thermostat responsive to the temperature of the enclosed space for controlling the last mentioned relay, whereby the second pump may be operated intermittently.

TIMOTHY J. LEHANE.
JOHN VAN VULPEN.

REFERENCES CITED

The following references are of record in the file of this patent:

UNITED STATES PATENTS

| Number | Name | Date |
|---|---|---|
| 2,240,731 | Van Vulpen | May 6, 1941 |
| 2,346,592 | Lehane et al. | Apr. 11, 1944 |